United States Patent [19]

Knipp et al.

[11] Patent Number: 5,344,853
[45] Date of Patent: Sep. 6, 1994

[54] STORABLE POLYOL MIXTURES CONTAINING MOLD RELEASE AGENTS

[75] Inventors: Ulrich Knipp, Bergisch Gladbach Nittum; Wulf von Bonin, Odenthal; Alfred Neuhaus, Leverkusen, all of Fed. Rep. of Germany

[73] Assignee: Bayer Aktiengesellschaft, Leverkusen, Fed. Rep. of Germany

[21] Appl. No.: 90,390

[22] Filed: Jul. 12, 1993

[30] Foreign Application Priority Data

Jul. 17, 1992 [DE] Fed. Rep. of Germany ....... 4223597

[51] Int. Cl.$^5$ .............................................. C08G 18/00
[52] U.S. Cl. .................... 521/128; 521/170; 524/714; 264/51; 264/328.1; 264/328.6; 264/328.8
[58] Field of Search ................ 521/128, 170; 524/714; 264/51, 328.1, 328.6, 328.8

[56] References Cited

U.S. PATENT DOCUMENTS

| | | | |
|---|---|---|---|
| 3,726,952 | 4/1973 | Boden et al. | 264/48 |
| 3,925,527 | 12/1975 | Kleimann et al. | 264/53 |
| 4,201,847 | 5/1980 | Kleimann et al. | 521/172 |
| 4,254,228 | 3/1981 | Kliemann et al. | 521/128 |
| 4,581,387 | 4/1986 | Werner et al. | 521/128 |

FOREIGN PATENT DOCUMENTS

| | | |
|---|---|---|
| 0275907 | 7/1988 | European Pat. Off. . |
| 0490342 | 6/1992 | European Pat. Off. . |
| 3443341 | 5/1986 | Fed. Rep. of Germany . |
| 3821908 | 4/1990 | Fed. Rep. of Germany . |
| 1365215 | 8/1974 | United Kingdom . |

*Primary Examiner*—Maurice J. Welsh
*Attorney, Agent, or Firm*—Joseph C. Gil; Lyndanne M. Whalen

[57] ABSTRACT

Polyol mixtures containing a mixture of internal mold release agents which are storage stable are made up of (a) from about 55 to about 95% by weight of a polyol mixture of (1) 30–70% by weight of at least one polyol with an OH value of more than 700 and (2) from about 30 to about 70% by weight of at least one polyol with an OH value of 700 or less than 700 and (b) from about 5 to about 45% by weight of a mixture of internal mold release agents made up of (1) from about 60 to about 95% by weight of at least one salt-like release agent and (2) from about 5 to about 40% by weight of at least one non-salt-like release agent containing an amide NH function or a urethane NH function. Known auxiliaries and additives may optionally be included. These polyol mixtures are useful in the production of rigid, semirigid and flexible polyurethane materials, particularly molded polyurethanes.

8 Claims, No Drawings

STORABLE POLYOL MIXTURES CONTAINING MOLD RELEASE AGENTS

BACKGROUND OF THE INVENTION

This invention relates to stable polyol mixtures ontaining mixtures of internal mold release agents and optionally other auxiliaries.

Rigid, semi-rigid and flexible polyurethane materials are often produced by machine-mixing a polyol mixture with a polyisocyanate and introducing the resulting mixture into a mold in which the reaction mixture subsequently cures, optionally with formation of layers differing in density. The mold may be made of any of a variety of materials (for example steel, aluminum or epoxy resin) and may be heated or unheated.

The demoldability of the workpiece formed from the reaction mixture is improved by using so-called external release agents or release lacquers or internal release agents. Tile external release agents are injected into the mold. The so-called internal release agents are incorporated in the reaction mixture and lead to good demoldability of the workpiece (molding) formed with no need for external release agents. Internal release agents may be added to the isocyanate component of the reaction mixture or preferably to the polyol component of the reaction mixture or to both components before these components are combined in the mixing machine.

internal release agents are often products containing aliphatic paraffin chains which, in general, should contain more than 10 carbon atoms. Reaction products or derivatives of long-chain fatty acids, more particularly natural fatty acids, such as oleic acid, tall oil fatty acid, stearic acid, palm kernel oil fatty acids, train oil fatty acids, ricinoleic acids, linoleic acids, erucic acids or mixtures thereof, are preferably used.

Derivatives or reaction products of such fatty acids which may be used as mold release agents include the hydrogenation and reduction products of those acids, esterification or amidation products of those acids, salts, urethanes or esters of such esterification or amidation products, amine salts of such fatty acids or addition products (for example, with carbodiimides) or the products obtained in Passerini or Ugi multi-center reactions.

Among the internal release agents, two types have proven to be particularly effective over the years. The first of these types contains an NH function either through amine bonds or through urethane bonds in the molecule. The second type contains amine salt functions which themselves may also contain amide functions. Both basic types may also have ester groups.

Examples of salt-like release agents include the oleic acid salt of the amide of 1 mol N-dimethyl-1,3-propylenediamine and oleic acid and the ester of 1 mol N-dimethyl ethanolamine and oleic acid. Examples of non-salt-like types of internal release agents containing -NH functions include the reaction product of diisocyanatodiphenyl methane types (i.e. polyisocyanates) with the ester of, for example, 1 mol pentaerythritol and 2 to 3 mol oleic acid or even the oleic acid amide of 1 mol oleic acid and the oleic acid ester of ethanolamine.

Both the non-salt-like release agents containing urethane or ester groups and the release agents containing salt groups are particularly suitable for use as internal release agents.

The polyol mixtures used for the production of moldings from polyol and polyisocyanate mixtures as described above frequently contain short-chain polyols (i.e., polyols produced from polyalcohols and/or (poly)amines by alkoxylation to OH values above 700), polyols of medium chain length (i.e., products reacted in the same way, but by more productive alkoxylation to OH values between 100 and 700), and long-chain polyols (i.e., products reacted in basically the same way, but to OH values of 8 to 100).

It is, of course, also possible to use short-chain, medium-chain or long-chain polyols characterized by the OH value ranges mentioned which have been produced by any method. Polyesters, polyamides, polyurethanes, polyols which have not been subjected to further modification (for example, glycerol, sugar products, formoses, etc.), the so-called polymer polyols, filler-containing polyols, so-called PHD polyols and other polyols and polyol mixtures containing polyisocyanate reaction products in the form of a stable dispersion may be used to produce molded materials.

In addition, polyol mixtures to be used in the production of molded articles often contain special pore stabilizers. optionally oxidation or radiation stabilizers, colorants, fragrances or other active substances, small quantities of water and optionally additional blowing agents.

DE-OS 1,953,637 describes a process for the production of foams by foaming a reaction mixture of polyisocyanates, compounds containing reactive hydrogen atoms, water and/or organic blowing agents and also additives in a closed mold. The salts of aliphatic carboxylic acids and primary amines or amide- and/or ester-modified amines containing at least 25 aliphatic carbon atoms may be used as additives.

DE-OS 2,307,589 describes a process for the production of foams based on polyisocyanates, in which the foams are produced in closed molds using reaction products of fatty acid esters and polyisocyanates and optionally other release agents. Oleic acid and tall oil fatty acid salts of the amide-modified amine (obtainable by reaction of N-dimethylaminopropyl amine with oleic acid or tallow oil fatty acid) are disclosed as optional release agents.

In the process disclosed in DE-OS 2,121,670, the foam moldings are produced using mixtures of at least two of the following components:

a) salts of aliphatic carboxylic acids and optionally amide-and/or ester-modified amines, b) COOH- and/or OH-functional esters of monobasic and/or polybasic carboxylic acids, and c) natural and/or synthetic oils, fats or waxes.

It has now been found that, in particular, the highly effective internal release agents of the type described above (for example the release agents containing urethane NH groups), tend to form unstable mixtures and to "float off" when added to the polyol mixtures in the relatively large quantities required for good demolding.

It is also known that mixtures of several release agents can be used as an internal release agent in the production of moldings, optionally even in the polyol and polyisocyanate phase, if it is desired to obtain particularly good release effects.

However, all of the known systems have the disadvantage that it is not possible to produce stable preparations (i.e., preparations storable for the prolonged periods typically involved in the transport and storage of polyurethane raw materials), with them. The polyol mixtures typically used in the production of moldings and the internal release agents are often largely incompatible, particularly when the release agents are added in quantities of more than 5%.

SUMMARY OF THE INVENTION

It is an object of the present invention to provide a polyol mixture containing internal release agents which is stable (i.e., storable for prolonged periods), and has a good release effect on molded articles formed from such polyol mixtures.

This and other objects which will be apparent to those skilled in the art are accomplished by combining a polyol having an OH value greater than 700, a polyol having an OH value of 700, or less than 700, a salt-like mold release agent and a non-salt-like mold release agent having amide or urethane NH functions in amounts such that the relative amounts are within specific ranges.

DETAILED DESCRIPTION OF THE INVENTION

The present invention relates to stable polyol mixtures containing mixtures of internal mold release agents which are made up of
  a) from about 55 to about 95% by weight (based on total weight of a) plus b) plus c)) of a polyol mixture that includes
    1) from about 30 to about 70% by weight (based on total weight of polyol mixture a)) of a polyol having an OH value of >700 and
    2) from about 30 to about 70% by weight (based on total weight of polyol mixture a)) of a polyol having an OH value of ≦700
and
  b) from about 5 to about 45% by weight (based on total weight of a) plus b) plus c)) of a mixture of mold release agents that includes
    1) from about 60 to about 95% by weight (based on total weight of mold release mixture b)) of a salt-like release agent and
    2) from about 5 to about 40% by weight (based on total weight of mold release mixture b)) of a non-salt-like release agent containing amide or urethane NH functions
and optionally,
  c) other auxiliaries.

In a preferred embodiment, the polyol mixture a) is made up of
  1) from about 40 to about 65% by weight of a polyol having an OH value of >700 and
  2) from about 35 to about 60% by weight of a polyol having an OH value of <700
and the mold release agent mixture b) is made up of
  1) from about 70 to about 90% by weight of a salt-like release agent and
  2) from about 10 to about 30% by weight of a non-salt-like release agent containing amide or urethane NH functions.

The polyol mixtures preferably contain from about 70 to about 88% by weight of the polyol mixture a) and from about 12 to about 30% by weight of the sum of the internal mold release agent mixture b) and optional auxiliaries c).

Water, stabilizers and catalysts are preferably used as the auxiliaries c).

The polyol mixtures of the present invention containing a mixture of internal mold release agents are used together with polyisocyanates in the production of polyurethane plastics by the known reaction injection molding process.

The stable mixtures of the present invention advantageously contain relatively large quantities of the internal release agents, stabilizers and other additives.

The polyols with OH values ≦700 include so-called medium-chain polyols and/or so-called long-chain polyols.

The mixture of release agents is added to the polyol mixture before the polyol mixture is mixed with the polyisocyanate component to produce a molded article. The mold release mixture is added to the polyol mixture a) in a quantity of from about 5 to about 45% by weight and preferably in a quantity of from about 12 to about 30% by weight, based on the total mixture of polyol mixture a), release agent mixture b) and auxiliaries c).

It has been found that a stable mixture (i.e., a mixture with no tendency to separate into different, coherent phases), which has consistent good release effects and which does not interfere with production of the moldings or lead to any deterioration in the properties of the moldings obtained, can only be prepared from compositions containing internal release agents having salt groups, internal release agents having amide or urethane NH functions but no salt functions and mixtures of short-chain and relatively long-chain polyols used in the relative amounts described above.

The release agent-containing polyol mixture of the present invention may be a stable clear solution, a stable dispersion, a stable emulsion or a stable suspension with no tendency to separate.

The release agent-containing polyol mixtures advantageously contain both neutral and basic polyol types.

Polyol mixture a) component 2) is preferably made up of a mixture having from about 25 to about 75% by weight polyol(s) having an OH value of 100 to 700 and from about 25 to about 75% by weight polyol(s) having an OH value below 100.

In a particularly preferred embodiment of the present invention, the internal release agents having salt-like functions also contain —CONH or —COOR functions and are salts of fatty acids containing more than 10 carbon atoms. The preferred internal release agents with no salt-like functions have at least one —CONH function and contain one or more —COR groups in the molecule. The —COR group is derived from fatty acids containing more than 10 carbon atoms.

The fatty acids mentioned above containing more than 10 carbon atoms are preferably liquid at room temperature. Natural fatty acids which are liquid at room temperature are particularly preferred.

The polyols used in the release-agent containing polyol mixtures of the present invention are preferably polyether polyols produced in known manner by alkoxylation of acidic, neutral or basic initiators with ethylene oxide and/or propylene oxide with the alkoxylating agents being incorporated in admixture either in blocks or in alternating arrangements.

Preferred salt-like internal release agents to be used in the mixtures of the present invention include the fatty acid salts of fatty acid amides and N-dimethyl-1,3-propylene diamine. Preferred non-salt-like internal release agents are reaction products of a polyisocyanate with the esters of 1 mol pentaerythritol and 3 mol fatty acid (preferably, oleic acid and/or tall oil fatty acid).

The polyol mixtures of the present invention may be reacted with any of the known polyisocyanates to form polyurethanes. The individual polyols and release agents present in the polyol mixtures containing release agents of the present invention are conventional materials which are familiar to the skilled artisan.

Polyurethanes may be produced from the polyol mixtures of the present invention and known polyisocyanates in accordance with known production and mixing techniques. The auxiliaries and additives useful in the production of polyurethanes in accordance with the present invention are also familiar to the expert.

In addition to those already mentioned, salt-like release agents useful in the mixtures of the present invention include: salts of fatty amines, such as octyl amine, oleoyl amine, dodecyl amine; salts of amines obtainable by reduction of fatty acid amides or basic amine derivatives obtainable by alkoxylation from ammonia or primary and/or secondary aliphatic or aromatic amines; salts of fatty acid esters of such alkoxylation products (for example, N-dimethyl ethanolamine, N-methyl diethanolamine or tetraethoxy or tetrapropoxyethylene diamine); or salts of amidoamines such as amidoamines of fatty acids and N-methyl diethylene triamine or N-dimethyl ethylene diamine or triethylene tetramine; and salts of oleic acid or tall oil fatty acids, train oil fatty acids and other fatty acids which are preferably liquid at room temperature.

In addition to those already mentioned, the non-salt-like release agents to be used in the mixtures of the present invention include: esters of fatty alcohols and fatty acids; fatty acid esters of monohydric and polyhydric alcohols (for example, fatty acid glycerides); esters of fatty acids and aminoalcohols; amides or amide esters of, for example, oleic acid and amine-alcohols (such as ethanolamine); urethanes of fatty acid partial esters of polyhydric alcohols and polyisocyanates; or esters of alcohols and amine acids amidated with fatty acids. The non-salt-like release agents contain at least one —CONH function in the molecule, preferably a —CONH function of the kind present in amides or urethanes.

The advantage or the mixtures of polyols and release agent mixtures of the present invention is that even when they are used in relatively large quantities, useful moldings which may lo be successfully removed from standard molds over production runs of almost indefinite length are obtained. The release agents in the polyol mixtures of the present invention show no tendency to separate from the mixture even over long transport and storage times. The release agent-containing polyol mixtures remain in the form of a solution or dispersion.

This storage stability is an improvement over the unstable prior art polyol mixtures used in the production of molded articles by reaction injection molding which had the tendency to separate. Because of this tendency to separate, the tanks in which the prior art polyol mixtures were stored had to be stirred. Only very short storage and transport times were possible with the known mixtures. These disadvantages are avoided with the polyol mixtures of the present invention.

Having thus described our invention, the following Examples are given as being illustrative thereof. All parts and percentages given in these Examples are parts by weight and percentages by weight, unless otherwise indicated.

EXAMPLES

The stability of each of the polyol mixtures made in the Examples below was evaluated after storage for 148 hours at room temperature.

After the components had been mixed in a high-speed mixer, they were stored in glass bottles of square cross-section. Phase behavior was qualitatively evaluated with the naked eye in the transmitted light of a light bulb.

The following rating system was used to classify the stability of each polyol mixture:

| Class 1 | Clear, single phase | Stable |
| --- | --- | --- |
| Class 2 | Homogeneous, slight clouding | Stable |
| Class 3 | Homogeneous, stronger clouding | Stable |
| Class 4 | Slight clouding with some phase separation | Unstable |
| Class 5 | Stronger clouding with phase separation | Unstable |
| Class 6 | Separation into cleanly separated phases | Unstable |

The following salt-like release agents S were used:

$S_1$: Salt obtained by reaction of 1 mol N-dimethyl-1,3-propylene diamine with 2 mol oleic acid in a nitrogen atmosphere. The salt of oleic acid amide was formed under amidation conditions.

$S_2$: Salt obtained by reaction of 1 mol N-methyl diethanolamine with 3 mol tall oil fatty acid under esterification conditions. The ester salt was formed.

The following non-salt-like release agents E were used:

$E_1$: Reaction product of 2 mol pentaerythritol trioleic acid ester and 1 mol technical diisocyanatodiphenyl methane prepared at approx. 80° C.

$E_2$: Amidoester of 1 mol ethanolamine and 2 mol oleic acid.

The following polyols D were used:

Short-chain polyols $D_1$: Propoxylation product of trimethylol propane, OH value 1020

$D_2$: Propoxylation product of trimethylol propane, OH value 860

Medium-chain polyols:

$D_3$: Propoxylation product of ethylene diamine, OH value 640

$D_4$: Ethoxylation product of N-ethyl diethanolamine, OH value 470

$D_5$: Ethoxylation product of glycerol, OH value 250.

Long-chain polyol:

$D_6$: Polyether polyol, OH value 42, based on 84% trimethytol propane and 16% propylene glycol, first 5% propoxylated, then co-propoxylated with 30% ethylene oxide and 40% propylene oxide and, finally, propoxylated with 25% propylene oxide.

Additive:

$P_1$: Commercially available polyether polysiloxane stabilizer (Goldschmidt AG).

Four mixtures (designated $M_1$, $M_2$, $M_3$ and $M_4$) of mold release agents were formed by mixing a salt-like release agent (either $S_1$ or $S_2$) with a non-salt-like release agent (either $E_1$ or $E_2$) or with an ester which is not a release agent within the scope of the present invention. The relative proportion of the release agents in each mixture was varied at 10% intervals from 0% salt-like release agent and 100% non-salt-like release agent (designated A) to 100% salt-like release agent and 0% non-salt-like release agent (designated L). The mixture series $M_1$ ($S_1$ and $E_1$) at different proportions and its concentration designations, for example, are as follows:

| Designation | M1A | M1B | M1C | M1D | M1E | M1F | M1G | M1H | M1I | M1K | M1L |
|---|---|---|---|---|---|---|---|---|---|---|---|
| S1 % | 000 | 10 | 20 | 30 | 40 | 50 | 60 | 70 | 80 | 90 | 100 |
| E1 % | 100 | 90 | 80 | 70 | 60 | 50 | 40 | 30 | 20 | 10 | 000 |
|  |  |  |  |  |  | Range according to the invention |  |  |  |  |  |

$M_2$ is the mixture series of $S_2$ and $E_1$
$M_3$ is the mixture series of $S_2$ and $E_2$; and
$M_4$ is the mixture series of $S_2$ and the ester of 2 mol oleic acid and 1 mol N-methyl diethanolamine free from —CONH groups which does not correspond to the invention.

The following polyol mixtures (M11 to M16) were prepared:

| Mixture | M11 | M12 | M13 | M14 | M15 | M16 |
|---|---|---|---|---|---|---|
| Parts D1 | 19.93 | 19.93 |  |  |  |  |
| Parts D2 | 29.89 | 29.89 | 29.89 | 29.89 | 29.89 | 29.89 |
| Parts D3 |  |  | 19.93 | 19.93 | 19.93 | 19.93 |
| Parts D4 | 4.53 | 4.53 | 4.53 | 4.53 | 4.53 | 4.53 |
| Parts D5 |  | 27.64 |  |  |  |  |
| Parts D6 | 27.64 |  | 27.64 | 27.64 | 27.64 | 27.64 |
| Parts water | 0.40 | 0.40 | 0.40 | 0.40 | 0.40 | 0.40 |
| Parts P1 | 1.81 | 1.81 | 1.81 | 1.81 | 1.81 | 1.81 |

The polyol mixture (M11 to M16) were mixed with release agent mixtures ($M_1$ to $M_4$) of types A to L in 10% steps, for example M11 with $M_1A$:

After 148 hours, the mixtures thus obtained were classified in the same way as described above. Classes 1 to 3 were stable while classes 4 to 6 were unstable.

Using the classification described above, polyol mixtures M11 to M16 were evaluated for stability in admixture with the release agent mixtures M1 to M4.

The mixture as a whole to be evaluated is designated in accordance with the above-mentioned codes.

| Example No. | Polyol Mixture (%) | Release Agent Mixture (%) | Evaluation classification |
|---|---|---|---|
| 1 | M11 (90%) | M1K (10%) | 2 |
| 2 | M11 (80%) | M1H (20%) | 3 |
| 3 | M11 (80%) | M1D* (20%) | 4 |
| 4 | M11 (70%) | M1H (30%) | 3 |
| 5 | M11 (50%) | M1H (50%*) | 6 |
| 6 | M11 (60%) | M1F* (40%) | 5 |
| 7 | M11 (50%) | M1F* (50%*) | 6 |
| 8 | M11 (70%) | M1I (30%) | 2 |
| 9 | M11 (70%) | M1F* (30%) | 4 |
| 10 | M12 (70%) | M1K (30%) | 1 |
| 11 | M12 (70%) | M1F* (30%) | 5 |
| 12 | M12 (80%) | M1I (20%) | 2 |
| 13 | M12 (50%) | M1I (50%*) | 6 |
| 14 | M12 (80%) | M1G (20%) | 3 |
| 15 | M12 (80%) | M1F* (20%) | 4 |
| 16 | M15 (90%) | M3I (10%) | 1 |
| 17 | M15 (80%) | M3K (20%) | 2 |
| 18 | M15 (50%) | M3K (50%*) | 6 |
| 19 | M15 (70%) | M3L* (30%) | 4 |
| 20 | M14 (60%) | M2K (40%) | 3 |
| 21 | M14 (60%) | M2L* (40%) | 6 |
| 22 | M14 (70%) | M2F* (30%) | 6 |
| 23 | M14 (70%) | M2I (30%) | 2 |
| 24 | M14 (90%) | M2I (10%) | 2 |
| 25 | M14 (90%) | M2F* (10%) | 6 |
| 26 | M13 (60%) | M1I (40%) | 1 |
| 27 | M13 (50%) | M1G (50%*) | 6 |
| 28 | M13 (60%) | M1F* (40%) | 5 |
| 29 | M13 (70%) | M1H (30%) | 2 |
| 30 | M13 (70%) | M1F* (30%) | 5 |
| 31 | M13 (80%) | M1G (20%) | 3 |
| 32 | M13 (80%) | M1F* (20%) | 4 |
| 33 | M13 (90%) | M1K (10%) | 2 |
| 34 | M15 (60%) | M4G* (40%) | 6 |
| 35 | M15 (90%) | M4G* (10%) | 6 |
| 36 | M15 (80%) | M4I* (20%) | 6 |
| 37 | M15 (70%) | M4K* (30%) | 6 |

*Outside the range according to the invention

Examples 1, 2, 4, 5, 8, 10, 12, 13, 14, 16, 17, 18, 20, 23, 24, 26, 29, 31 and 33 show that stable mixtures were obtained when polyols and release agents of the type required in the present invention are used in the required range. Unstable mixtures (classification 4 to 6) were obtained whenever the mixing ranges or materials were outside the scope of the present invention (Examples 3, 6, 7, 9, 11, 13, 15, 18, 19, 21, 22, 25, 27, 28, 30 and 32).

Examples 34 to 37 show that incompatibility or inadequate lo stability is observed when mixtures of release agents that do not correspond to the invention are used (for example those of the release agent mixture series $M_4$).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable composition made up of
   a) from about 55 to about 95% by weight, based on total weight of the composition of a polyol mixture made up of
      (1) from about 30 to about 70% by weight, based on total weight of polyol mixture, of a polyol having an OH value of more than 700 and
      (2) from about 30 to about 70% by weight, based on total weight of polyol mixture, of a polyol having an OH value of 700 or less than 700,
   and
   b) from about 5 to about 45% by weight, based on total weight of the composition, of a mixture of mold release agents made up of
      (1) from about 60 to about 95% by weight, based on total weight of the release agent mixture, of a salt-like release agent and
      (2) from about 5 to about 40% by weight, based on total weight of the release agent mixture, of a non-salt-like release agent containing an amide NH or urethane NH function,
   and optionally,
   c) an auxiliary agent.

2. The composition of claim 1 in which the polyol mixture a) is made up of
  (1) from 40 to 65% by weight of a polyol having an OH value greater than 700 and
  (2) from 35 to 60% by weight of a polyol having an OH value less than 700
and the mold release agent mixture b) is made up of
  (1) from 70 to 90% by weight of a salt-like release agent and
  (2) from 10 to 30% by weight of a non-salt-like release agent containing an amide or urethane CONH function.

3. The composition of claim 1 which is made up of from about 70 to about 88% by weight of polyol mixture a) and from about 12 to about 30% by weight of internal mold release agent mixture b).

4. The composition of claim 1 in which at least one auxiliary agent c) is included.

5. The composition of claim 4 in which the auxiliary agents include at least one agent selected from the group consisting of water, stabilizers and catalysts.

6. The composition of claim 4 which is made up of from about 70 to about 88% by weight of polyol mixture a) and from about 12 to about 30% by weight of internal mold release agent mixture b) plus auxiliary agent c).

7. A process for the production of a polyurethane in which the composition of claim 1 is reacted with a polyisocyanate by a reaction injection molding process.

8. A process for the production of a polyurethane in which the composition of claim 6 is reacted with a polyisocyanate by a reaction injection molding process.

* * * * *